June 25, 1963  J. B. CATALDO  3,095,469
JOINT MEANS FOR BUS DUCT
Filed May 2, 1961  2 Sheets-Sheet 2
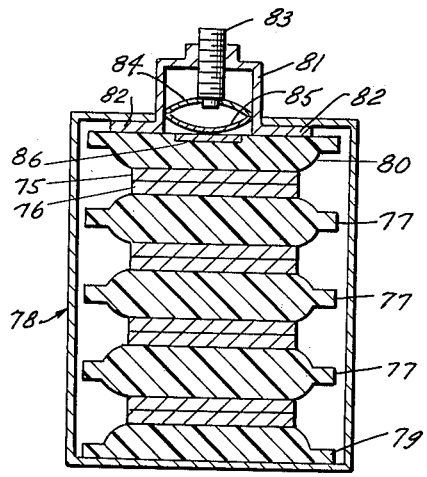
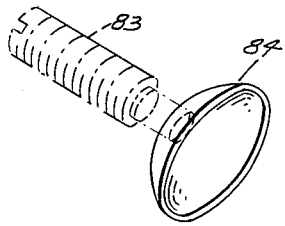
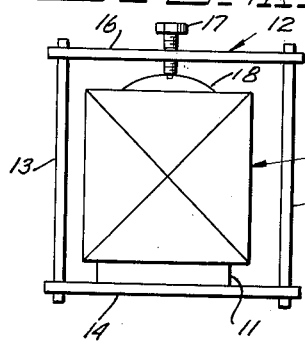
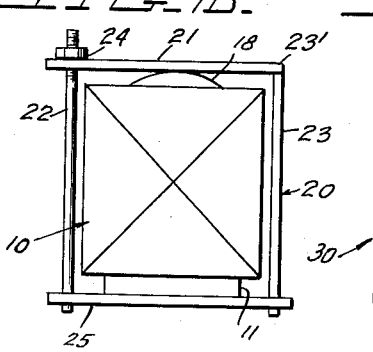
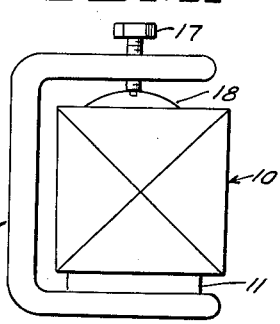
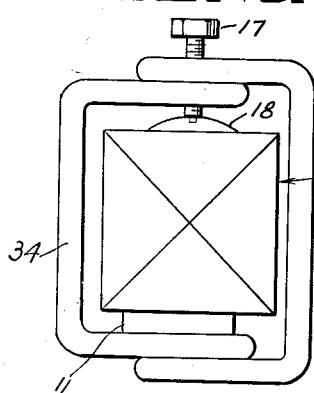
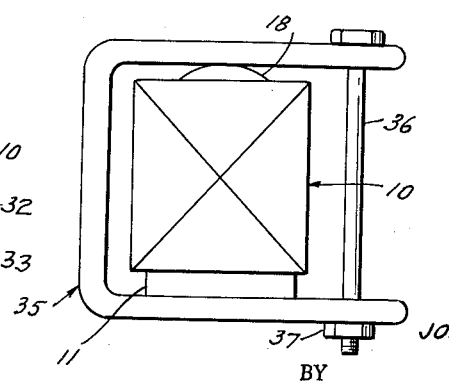
INVENTOR.
JOHN B. CATALDO
BY
OSTROLENK, FABER, GERB & SOFFEN
ATTORNEYS

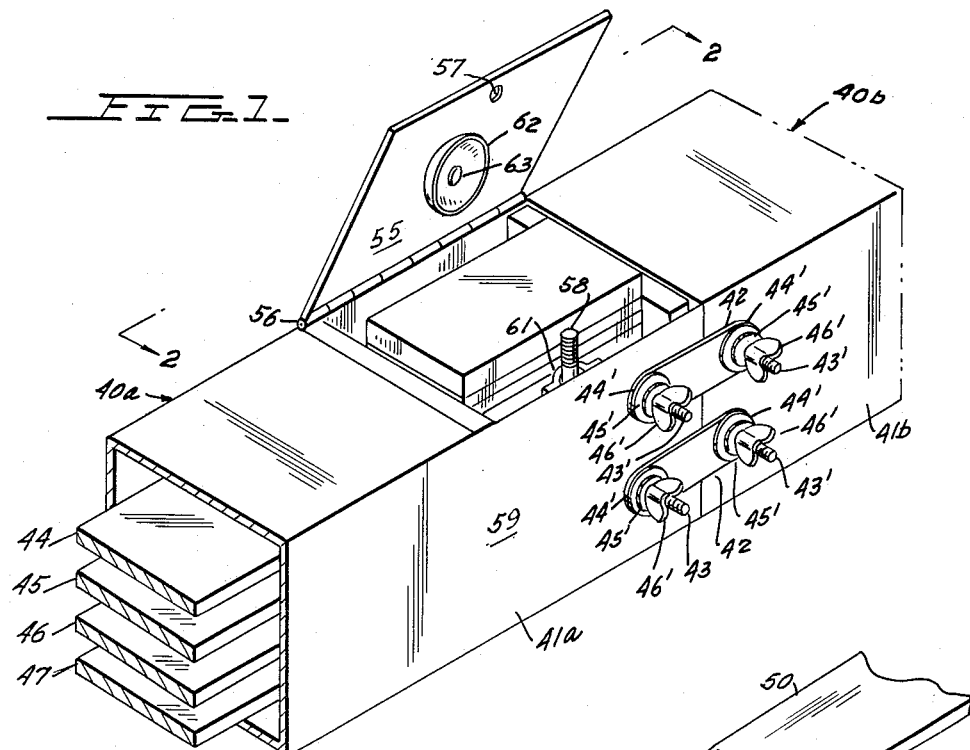
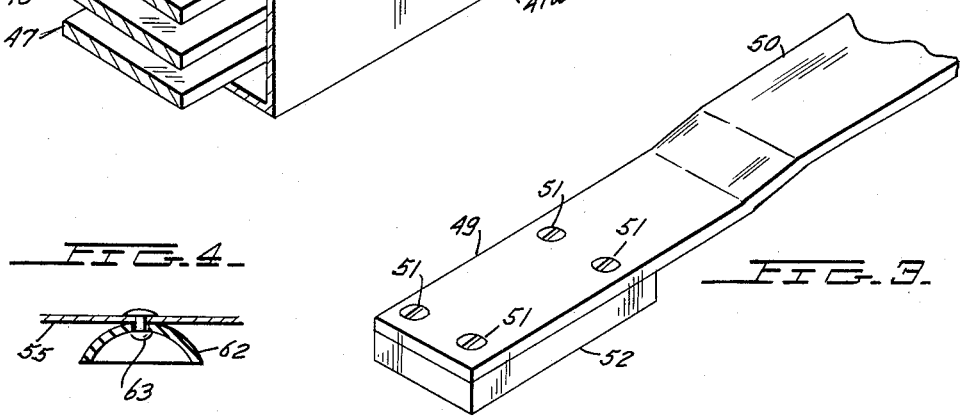
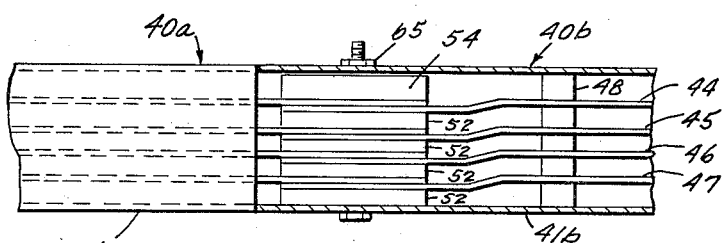

United States Patent Office 3,095,469
Patented June 25, 1963

3,095,469
JOINT MEANS FOR BUS DUCT
John B. Cataldo, Bloomfield Hills, Mich., assignor to I-T-E Circuit Breaker Company, Philadelphia, Pa., a corporation of Pennsylvania
Filed May 2, 1961, Ser. No. 107,161
4 Claims. (Cl. 174—88)

This invention relates to bus ducts in general and more particularly to means for efficiently making electrical connections between adjacent bus duct sections.

The effectiveness of a bus duct for conducting current is not only a function of the size and configuration of its bus bars but is to a great extent controlled by the adequacy of its joint constructions. That is, since bus duct is prefabricated, usually in ten foot sections, a great many joints must be installed in distribution runs which often exceeds many hundreds of feet. If a bus duct system is to perform adequately in service, these joints must be constructed so that there will be a minimum chance for effecting improper electrical connections.

In typical prior art bus duct joints there is a certain amount of overlap of mating bus bars with one or more bolts, depending upon the size of the bars, being installed through the overlapping bus bar portions. Associated spring type washers are usually included to maintain adequate contact pressures under differential expansion conditions of heating and cooling. The number of bolt, nut and washer combinations can become excessive in larger sizes of duct. For example, a 1,000 ampere duct containing 4" wide bus bars requires four bolts per bar per joint. Thus, in a four conductor duct a minimum of 48 elements are necessary to effect each joint.

It is apparent that the time for installing and tightening the joints will be very lengthy and the probability of not tightening some bolts, or of inadequately tightening others becomes quite high. In addition, once a system has been installed and is in operation, inspection and maintenance of these bolts also imposes time consuming and often ineffective procedures, since the system usually must be deenergized if retightening of the bolts is required.

Since large numbers of bolts must be used at each joint a number of design problems have arisen. Adequate room must be available for the proper use of tools to install and tighten the bolts. Adequate spacings must be provided for electrical clearance. There must be sufficient distances between bars to prevent contact during movement caused by the mechanical stresses which accompany short circuit conditions. These requirements for adequate clearances result in a voluminous joint region.

This invention overcomes the problems noted above by providing means whereby a single bolt may be utilized to properly and safely effect a bus duct joint regardless of the size, number and spacing of the conductors. This is accomplished by providing a construction in which solid insulators are interposed between pairs of abutting overlapping bus bars and also between the outer pairs of bus bars and the duct housing. An anchoring means is provided which at least partially surrounds the bus bars at the joint region, and a bolt means acting upon one arm of the anchoring means is effective to force the stack of overlapping bus bars and insulators toward the opposite arm of the anchoring means. In this manner all of the overlapping regions of bus bars as well as the insulators are firmly clamped together in a stack thereby effecting good electrical connections between the bus bars with a minimum possibility that the connection between bus bars in any pair can be made improperly.

Typically, the anchoring means comprises the bus duct housing. However, the anchoring means may also comprise a device which is interposed between the housing and the bus bar insulator stack. This device may, for example, comprise a rectangular structure, a U-shaped structure, or a pair of oppositely facing U-shaped structures with the arms of one entered between the arms of the other.

Accordingly, a primary object of this invention is to provide a novel means for effecting joint connections in an improved electrical and mechanical manner for a bus duct run having a multiplicity of bus bars of different polarities.

Another object is to provide means for effecting a bus duct joint wherein the installation time of the joint is decreased, the probability that a joint will be improperly made is reduced to a minimum, and inspection of the joint for maintenance purposes is simplified.

Still another object is to provide means for effecting a bus duct joint whereby a minimum number of bolts must be tightened.

A further object is to provide means for effecting a bus duct joint whereby bus bar spacing at the joint region can be decreased so that the space required to enclose and house the joint is considerably decreased.

A still further object is to provide means for effecting a bus duct joint in which retightening of the joint bolt can be made safely with the system energized.

Yet another object is to provide means for effecting a bus duct joint whereby isolation between phases at the joint is achieved in a simple and complete manner and a maximum resistance against mechanical stresses accompanying short circuit currents is obtained.

These as well as other objects of this invention shall become readily apparent after reading the following description of the accompanying drawings in which:

FIGURE 1 is a fragmentary perspective of a bus duct run showing the joint region and a first embodiment for obtaining an effective joint with this joint being constructed in accordance with the teachings of the instant invention.

FIGURE 2 is a side elevation of the joint region looking in the direction of arrows 2—2 of FIGURE 1 with the duct housing partially broken away.

FIGURE 3 is a perspective illustrating the manner in which a joint insulator is secured to a bus bar.

FIGURE 4 is a detail illustrating the manner in which the expansion compensating and force transmitting means is secured in place.

FIGURE 5 is a cross-section taken through the joint region of another embodiment of this invention.

FIGURE 6 is an enlarged perspective of a spring washer in the embodiment of FIGURE 5.

FIGURES 7A–7E are schematics illustrating various forms of the instant invention.

Now referring to the figures and more particularly to FIGURES 7A–7E. In these embodiments the rectangular area designated by reference numeral 10 represents a stack of bus bars and solid insulators at the joint region of a bus duct run. That is, starting at the top there is a rigid solid insulator, a pair of overlapping abutting bus bars, another pair of overlapping abutting bus bars, and so on to the bottom of stack 10. If the bottom of the stack is a solid insulator then member 11 will preferably be a spring washer. However, if the bottom of stack 10 is a bus bar then member 11 must be a solid insulator. The stack is completely described in connection with the embodiments of FIGURES 1–6.

In FIGURE 7A there is an anchoring means 12 which surrounds the bus bar stack at the joint region. Anchoring means 12 comprises four structural members 13–16 fixedly secured to each other to form a rectangle. Tightening bolt 17 is threadably mounted to structural member 16 at the center thereof with the tip of bolt 17 in engagement with spring cup washer 18 also at the center thereof. The peripheral edge of cup washer 18 abuts the top of stack 10. Thus, it is seen that by tightening bolt 17 stack 10, hence the members thereof, will be forced toward structural member 14 to firmly seat abutting bus bars against each other and thereby achieve good electrical contact. Cup washer 18 is provided as means to compensate for differential expansions due to temperature changes and mechanical stresses.

Thus, in essence, it is seen that bolt 17 is in effect a threaded force multiplying means which acts upon structural member 16 to urge stack 10 toward the opposite structural member to effect good electrical connections at the joint region in a simple and positive manner.

In the embodiment of FIGURE 7B the anchoring means also comprises a rectangular structure 20. However, top 21 thereof is pivoted to the top of side 22 at 23' and the upper end of side 23 is threaded and passes through a clearance aperture (not shown) at the end of top 21 opposite pivot 23'. Nut 24, mated with the threaded end of bolt 23, when tightened pivots top 21 counterclockwise about its pivot 23' urging cup washer 18 against the top of stack 10 thereby forcing it toward the bottom 25 of anchoring means 20.

In the embodiment of FIGURE 7C anchoring means 30 comprises a generally U-shaped member positioned on its side. Tightening bolt 17 is mated to a threaded aperture in one arm of member 30 with the free end of bolt 17 engaging the central portion of cup washer 18. Thus, when bolt 17 is tightened stack 10 is urged toward the other arm of anchoring means 30.

In the embodiment of FIGURE 7D anchoring means 32 comprises oppositely facing U-shaped members 33, 34 positioned on their sides with the arms of member 34 entered between the arms of member 33. Tightening bolt 17 passes through a clearance aperture in one arm of member 33 and is in operative engagement with the threads of an aligned aperture in one arm of member 34. The free end of bolt 17 is in engagement with the central portion of cup washer 18. Thus, it is seen that tightening bolt 17 urges stack 10 toward the other arms of members 33, 34.

In the embodiment of FIGURE 7E anchoring means 35 again comprises a generally U-shaped member positioned on its side. Tightening bolt 36 comprises a member extending through aligned apertures in the arms of member 35 near the free ends thereof. Nut 37, in engagement with the threads at the free end of bolt 36, is provided for tightening of the joint. That is, member 35 is constructed of material which is to some extent flexible so that when nut 37 is tightened the free ends of the arms comprising member 35 will be caused to converge. A force is thereby transmitted through cup washer 18 to the top of stack 10 urging it toward the lower arm of member 35.

Now referring more particularly to FIGURES 1-4. In these figures the housings 41a, 41b of bus duct sections 40a, 40b are positioned in axial alignment with the ends thereof abutting each other. This position is maintained by means of a pair of clamping plates 42 on opposite sides of the bus duct sections 40a, 40b. Each plate is provided with apertures which receive threaded rods 43 extending outwardly from housings 41a, 41b. A flat washer 44', a lock washer 45', and a wing nut 46' are provided for each of the threaded rods 43. The tightening of wing nut 46 forces clamping plates 42 in place. As is well known to the art, each of the housings 40a, 40b are elongated and are of generally rectangular cross section having mounted therein a plurality of longitudinally extending bus bars 44-47. A plurality of insulating spacer means 48, of a construction well known to the art, maintain bus bars 44-47 in face to face spaced apart relationship and also insulate bars 44-47 from the housing. The left end of each of the bus bars is provided with an offset 49. Four screws 51 whose flat heads are positioned within countersunk holes of offset 49 secure solid insulator 52 to offset 49 at the side thereof most remote from the main section 50 of the bus bars. Offset 49 is so positioned that the free end of main section 50 of the adjacent bus section, when abutting offset 49, will be in alignment with the main section 50 of the mating bus bar. As best seen in FIGURE 2, the joint region comprises a stack consisting of solid insulator 54, a pair of overlapping bus bar ends, solid insulator 52, another pair of overlapping bus bar ends, another solid insulator 52, another pair of overlapping bus bar ends, another solid insulator 52, another pair of overlapping bus bar ends and finally another solid insulator 52.

Housing 41a in the joint region is provided with an openable cover 55 pivoted along its edge 56. Clearance aperture 57 is provided in cover 55 near the other edge at the center thereof. Aperture 57 receives stud 58 which is fixedly secured to the inside surface of housing side 59 by clamp 61. Cup washer 62 is loosely fastened to cover 55 near the center thereof by means of rivet 63. When cover 55 is closed stud 58 extends through aperture 57.

Nut 65 (FIGURE 2), external of door 55, is in threaded engagement with stud 58. When nut 65 is tightened cover 55 is rotated about its pivot 56. In this manner a force is transmitted through cup washer 62 to the stack of overlapping bus bars and insulators to urge the stack toward the surface of housing 41a opposite cover 55 and in so doing the bus bars in each of the pairs are firmly seated against one another to effect good electrical contact. It should be apparent that the embodiment of FIGURES 1-4 is identical to the embodiment illustrated in the schematic of FIGURES 7B.

FIGURE 5 illustrates an embodiment in which there is a stack comprising three sets of bus bars 75, 76 whose ends overlap and abut at the joint region. The pairs of bus bars 75, 76 are supported in the joint region by rigid insulators 77 and the ends of the stack are insulated from the bus duct housing 78 by solid insulators 79, 80. The top surface of housing 78 at the joint region is provided with an aperture which receives member 81 having an inverted generally U-shaped cross-section with outboard extensions 82, 82 at the free ends of the U-arms, with these extensions being interposed between the inside of the housing top wall and the top surface of insulator 80.

Tightening screw 83 is mounted to a threaded aperture at the center of the web of U-shaped member 81. The lower end of screw 83 is in operative engagement with the central portion of cup washer 84 whose peripheral edge is in engagement with the peripheral edge of an oppositely facing cup washer 85. The central portion of cup washer 85 abuts hardened insert 86 in the top surface of insulator 80. Thus, it is seen that as screw 83 is tightened force is transmitted through cup washers 84, 85 to the stack comprising the pairs of overlapping bus bars 75, 76 and insulators 77, 79, 80 with this force urging the stack toward the bottom surface of housing 78.

It is apparent to those skilled in the art that the embodiments illustrated in the schematics of FIGURES 7A-7E are such that the anchoring means disclosed therein may be used in addition to or as a substitution for the housing in the joint region. For example, members 33, 34 may be only as extensive as the joint region and be interposed between the stack and the inside of the housing. In the alternative the duct housing may be constructed of two oppositely facing U-shaped members with the arms of one entered between the arms of the other.

While my invention has been described in connection with a stack comprising four bus bars it should be apparent that the teachings of the invention are applicable to stacks having a plurality of bus bars not necessarily four in number.

Thus, this invention provides novel means for effecting electrical connections at the joint region between adjacent sections of a bus duct run. This means is characterized by the fact that a force is generated which urges the stack of bus bars and insulators at the joint region toward one surface of the duct housing.

In the foregoing, the invention has been described only in connection with preferred embodiments thereof. Many variations and modifications of the principles of the invention within the scope of the description herein are obvious. Accordingly, it is to be bound not by the specific disclosure herein but only by the appending claims.

I claim:

1. The combination comprising a first bus duct section and a second bus duct section in electrical series at a joint region; each of said bus duct sections comprising a plurality of elongated face to face bus bars mounted in spaced parallel relationship; said first bus duct section bus bars overlapping and abutting corresponding bus bars of said second bus duct section at said joint region; insulating means at said joint interposed between pairs of abutting bus bars; an anchoring means having opposite surfaces between which said joint region is disposed; a threaded force multiplying means operatively constructed and positioned to act upon a first of said surfaces and urge said bus bars toward the other of said surfaces to firmly seat abutting bus bars against each other and thereby achieve good electrical contact; said anchoring means comprising a pair of oppositely facing U-shaped members with the arms of one of said U-shaped members being positioned between the arms of the other of said U-shaped members, said force multiplying means comprising a screw extending through an arm of each U-shaped member and threaded to the inner one thereof.

2. The combination comprising a first bus duct section and a second bus duct section in electrical series at a joint region; each of said bus duct sections comprising a plurality of elongated face to face bus bars mounted in spaced parallel relationship; said first bus duct section bus bars overlapping and abutting corresponding bus bars of said second bus duct section at said joint region; insulating means at said joint interposed between pairs of abutting bus bars; an anchoring means having opposite surfaces between which said joint region is disposed; a threaded force multiplying means operatively constructed and positioned to act upon a first of said surfaces and urge said bus bars toward the other of said surfaces to firmly seat abutting bus bars against each other and thereby achieve good electrical contact; each of the bus duct section including an elongated housing wherein said bus bars are disposed, said joint region being positioned and constructed whereby a first of said housings exerts a reaction force opposing forces generated by tightening of said force multiplying means; a second wall of said housing including a cover hinged along a first edge thereof, said force multiplying means comprising a threaded member extending through said cover at a point near a second edge thereof opposite said first edge.

3. The combination of claim 2 in which there is a resilient expansion compensation means carried by the cover and operatively positioned to transmit forces created by tightening of said force multiplying means to said bus bars.

4. The combination of claim 3 in which the compensating means comprises a cup washer.

References Cited in the file of this patent

UNITED STATES PATENTS

| | | |
|---|---|---|
| 1,513,340 | Miner | Oct. 28, 1924 |
| 1,715,478 | Steinmayer | June 4, 1929 |
| 1,740,642 | Austin | Dec. 24, 1929 |
| 2,906,811 | Fisher | Sept. 29, 1959 |
| 3,004,096 | Rowe | Oct. 10, 1961 |
| 3,004,097 | Johnston et al. | Oct. 10, 1961 |

FOREIGN PATENTS

| | | |
|---|---|---|
| 6,183 | Netherlands | June 23, 1921 |